United States Patent Office 3,140,950
Patented July 14, 1964

3,140,950
BLUEPRINT PAPER AND COATING COMPOSITION INCLUDING POLYVINYL ALCOHOL FOR MAKING SAME
Harold J. Brunk, 7444 N. Maplewood Ave., Chicago 45, Ill.
No Drawing. Filed May 21, 1962, Ser. No. 196,509
4 Claims. (Cl. 96—92)

The invention relates to blueprint papers and coating compositions for use in their manufacture.

Blueprint papers are customarily made by coating paper with an aqueous solution of a soluble ferricyanide salt and ferrioxalate salt. Two types of coating solutions are in general use. One is called the "latitude" in which a ferrocyanide salt is used with the ferricyanide salt. This is blue in color. It does not require a predevelopment before the water wash used in the blueprint process. It does not bleed, and it gives good blue color. A slight exposure through weak pencil lines does not wash out white, leaving a slight blue tint. The other type of coating solution is called the "lemon yellow" or "yellow." In this coating solution the ferricyanide salt is used without the ferrocyanide. After exposure to actinic light in the blueprint process, it is usually developed ahead of the water wash with a ferrocyanide to prevent bleeding and to intensify the blues.

I have discovered that incorporating a polyvinyl alcohol with the ferricyanide and potassium ferrocyanide in the "latitude" and also in the yellow coating solution gives improved results in the blueprint paper.

In the yellow formula, there is obtained faster printing speed, great depth of navy blue color, no bleeding and therefore white lines. Pre-development, ahead of water wash, with potassium ferrocyanide is not necessary, although it can be done with polyvinyl alcohol treated ferrocyanide.

It is well known that the ratio of potassium ferricyanide to ferric oxalate salt controls the color and printing speed. A 7 to 1 ratio is a fast printing paper of fair color. A 5 to 1 ratio is a medium to slow paper with good color. With the use of polyvinyl alcohol in admixture with the potassium ferricyanide and the ferric ammonium oxalate a 5 to 1 ratio instead of being a slow to medium printing speed is as fast as the 7 to 1 ratio in the absence of polyvinyl alcohol, and the depth of color is superior to anything hitherto obtained.

In the latitude formula the use of the polyvinyl alcohol in the coating solution gives a 25% increase in printing speed. The color is also much improved with perfect white lines.

The polyvinyl alcohol is used in the ratio of at least 1 part by weight of polyvinyl alcohol to 400 parts by weight of alkali metal ferricyanide (the ammonium salt being considered as an alkali metal). The upper limit polyvinyl alcohol is a matter of expediency but ordinarily more than 10 parts of polyvinyl alcohol to 400 of ferricyanide salt should not be used as a masking effect starts to take place. An excess of polyvinyl alcohol will not be taken up in the solution but will be thrown out as a resin gum.

The preparation of the coating solution is carried out by first dissolving the polyvinyl alcohol in a small quantity of boiling water and then adding the potassium ferricyanide with stirring, for example 5 pounds of the ferricyanide in 1 gallon of water containing the dissolved polyvinyl alcohol. Then add 19 gallons of an aqueous warm solution of 35 pounds of dissolved ferric ammonium oxalate. Ferri ammonium oxalate cannot be included in the boiling polyvinyl alcohol solution as it breaks down on boiling and it would be impractical due to the large amount of water required to boil.

The following examples illustrate this invention:

Example 1

Water ------------------------------- 6½ fluid oz.
Polyvinyl alcohol -------------------- .0148 oz.

The above mixture is boiled to form a solution.
Add with stirring: potassium ferricyanide, 4½ oz.
Then add: warm water, 3 qts. 25½ fluid oz.
Add: ferric ammonium oxalate, 29½ oz.
The above solution is coated on sized paper sheets and dried to form a yellow type blueprint paper.

Example 2

Water ------------------------------- 13 fluid oz.
Polyvinyl alcohol -------------------- .029 oz.

The above is boiled to form a solution.
Add mixed together with stirring:

|  | Oz. |
|---|---|
| Potassium ferricyanide | 3½ |
| Potassium ferrocyanide | 5.7 |

Add:
Warm water ------------------------- 3 qts. 19 oz.
Ferric ammonium oxalate ------------ 23 oz.

The above solution is coated on paper sheets in a manner well known to the art and dried to form a latitude blueprint paper.

It will be understood that the invention is applicable to all blueprint coating compositions and blueprint paper having a coating containing polyvinyl alcohol and a soluble ferricyanide with or without ferrocyanide.

I claim:

1. A blueprint paper having a coating thereon consisting essentially of an alkali metal ferricyanide, ferric ammonium oxalate and polyvinyl alcohol, the polyvinyl alcohol being present with the ferricyanide in a ratio by weight of between approximately 1–400 and 10 to 400.

2. A blueprint paper having a coating thereon consisting essentially of an alkali metal ferricyanide, an alkali metal ferrocyanide, ferric ammonium oxalate, and polyvinyl alcohol, the polyvinyl alcohol being present in a ratio of one part to ten parts by weight to 400 parts by weight of ferricyanide and ferrocyanide.

3. A coating composition suitable for use in the manufacture of blueprint paper consisting essentially of an aqueous solution of an alkali metal ferricyanide, ferric ammonium oxalate, and polyvinyl alcohol, the polyvinyl alcohol being present in a ratio of one part to ten parts by weight to 400 parts by weight of the ferricyanide and the ratio of alkali metal ferricyanide of ferric ammonium oxalate being approximately 5 to 1.

4. A coating composition suitable for use in the manufacture of blueprint paper consisting essentially of an alkali metal ferricyanide, alkali metal ferrocyanide, ferric ammonium oxalate, and polyvinyl alcohol, the polyvinyl alcohol being present in a ratio of one part to ten parts by weight of polyvinyl alcohol to 400 parts by weight of alkali metal ferricyanide and alkali metal ferrocyanide.

References Cited in the file of this patent

UNITED STATES PATENTS

| 1,964,136 | Prufer et al. | June 26, 1934 |
| 2,154,506 | Hinman et al. | Apr. 18, 1939 |
| 2,238,301 | Barnes et al. | Apr. 15, 1941 |
| 2,443,844 | Vallen et al. | June 22, 1948 |
| 2,522,771 | Barnes et al. | Sept. 19, 1950 |
| 2,999,016 | Beeber et al. | Sept. 5, 1961 |

FOREIGN PATENTS

| 1,096,195 | Germany | Dec. 29, 1960 |